United States Patent
Keller et al.

(10) Patent No.: US 8,602,352 B2
(45) Date of Patent: Dec. 10, 2013

(54) METHOD FOR OPERATING A LANDING GEAR ASSEMBLY WITH A BREAKER STRUT

(75) Inventors: Nicolas Keller, Alfortville (FR); Albert De Pindray, Magny les Hameaux (FR); Edouard Campbell, Savigny sur Orge (FR); Dominique Ducos, Savigny sur Orge (FR); Sebastien Dubois, Massy (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 23 days.

(21) Appl. No.: 13/376,160

(22) PCT Filed: Jun. 3, 2010

(86) PCT No.: PCT/EP2010/057778
§ 371 (c)(1),
(2), (4) Date: Dec. 2, 2011

(87) PCT Pub. No.: WO2010/139756
PCT Pub. Date: Dec. 9, 2010

(65) Prior Publication Data
US 2012/0080559 A1  Apr. 5, 2012

(30) Foreign Application Priority Data
Jun. 5, 2009 (FR) .................................. 09 02721

(51) Int. Cl.
*B64C 25/10* (2006.01)
*B64C 25/20* (2006.01)

(52) U.S. Cl.
USPC ................ 244/102 A; 244/100 R; 244/102 R

(58) Field of Classification Search
USPC ............................ 244/100 R, 102 A, 102 R
See application file for complete search history.

(56) References Cited

U.S. PATENT DOCUMENTS

| 2,222,975 A | | 11/1940 | Brown | |
|---|---|---|---|---|
| 2,413,986 A | * | 1/1947 | Martin | 244/102 R |
| 4,568,045 A | * | 2/1986 | Mayer | 244/102 R |
| 5,100,083 A | * | 3/1992 | Large et al. | 244/102 SS |
| 8,123,161 B1 | * | 2/2012 | Collins | 244/99.9 |
| 8,272,285 B2 | * | 9/2012 | Kearns et al. | 74/89.37 |
| 8,292,219 B2 | * | 10/2012 | Collins | 244/102 SL |
| 2008/0230650 A1 | | 9/2008 | Meyer et al. | |
| 2012/0037752 A1 | * | 2/2012 | Collins | 244/102 SL |

FOREIGN PATENT DOCUMENTS

| CH | 215 809 A | 7/1941 |
|---|---|---|
| FR | 2 801 865 A1 | 6/2001 |

* cited by examiner

*Primary Examiner* — Tien Dinh
*Assistant Examiner* — Michael Wang
(74) *Attorney, Agent, or Firm* — Sughrue Mion, PLLC

(57) ABSTRACT

A method of operating an aircraft landing gear between a deployed position and a retracted position. The landing gear comprises a leg hinged to the aircraft, the leg being stabilized in the deployed position by a folding strut comprising two hinged-together links, the strut being held in an aligned position by a stabilizer member comprising two hinged-together links themselves held in alignment by a locking member. The method comprises the steps of arranging the strut (2; 102) and the stabilizer member (4; 104) in such a manner that at least one of the links (4*a*; 104*a*) of the stabilizer member moves continuously during a movement of the leg from the deployed position to the retracted position, and of attaching an operating actuator (10; 110) to the link in order to cause the link to pivot against the locking member and to exert thereon a force tending to move the leg.

6 Claims, 2 Drawing Sheets

METHOD FOR OPERATING A LANDING GEAR ASSEMBLY WITH A BREAKER STRUT

CROSS REFERENCE TOP RELATED APPLICATIONS

This application is a National Stage of International Application No. PCT/EP2010/057778 filed Jun. 3, 2010, claiming priority based on French Patent Application Nos. 09-02721, filed Jun. 5, 2009, the contents of all of which are incorporated herein by reference in their entirety.

The invention relates to a novel method of operating a landing gear with a folding strut. The term "operating" is used to mean moving the landing gear between its deployed position and its retracted position, or vice versa.

TECHNOLOGICAL BACKGROUND OF THE INVENTION

Landing gears are known that are pivotally mounted on an aircraft structure to move between a retracted position and a deployed position, the landing gear being stabilized in the deployed position by a brace member including at least one folding strut having two hinged-together links that, when the landing gear is in the deployed position, are held substantially in mutual alignment by a stabilizer member, itself comprising two hinged-together links that are likewise held substantially in mutual alignment by a locking member.

The strut is attached firstly to the leg of the landing gear and secondly to the structure of the aircraft, while the stabilizer member is attached firstly to the strut and secondly to the leg, or to the structure of the aircraft.

It is known to cause the landing gear to move by means firstly of a raising actuator, e.g. an actuator coupled to the leg of the landing gear, and secondly by an unlocking actuator serving to counter the locking member.

Thus, starting from the deployed position, the unlocking actuator is actuated first and it acts against the locking member so as to force the two links of the stabilizer member to move out of alignment, thereby consequently forcing the two links of the strut to move out of alignment. When moved out of alignment in this way, they can no longer oppose raising of the landing gear driven by the action of the raising actuator. Thus, raising such a landing gear requires two actuators.

Landing gears having folding struts are also known in which the two links of the strut are stabilized in an aligned position by means of return springs that keep the links in an aligned position that is defined by an internal abutment between the two links. In this type of landing gear, it is known to cause the landing gear to be raised by using a single actuator that acts on that one of the links that is hinged to the structure of the aircraft. The actuator causes the associated link to turn against the return springs. As it continues to turn, it causes the landing gear to move under drive from the links that, although out of alignment, continue to be connected to each other. Thus, the same actuator unlocks and raises the landing gear.

Nevertheless, such a configuration is suitable only for landing gears that do not include a member for stabilizing the alignment. In a landing gear having a folding strut that is stabilized by a stabilizer member itself having two links, the lifting actuator attached to one of the links of the strut is not capable of moving the links of the stabilizer member out of alignment, thereby preventing any movement of the landing gear.

OBJECT OF THE INVENTION

The invention seeks to propose a simple method of operating a landing gear having a folding strut and an alignment stabilizer member.

BRIEF DESCRIPTION OF THE INVENTION

In order to achieve this object, there is provided a method of operating an aircraft landing gear between a deployed position and a retracted position, the landing gear comprising a leg hinged to the aircraft, the leg being stabilized in the deployed position by a folding strut comprising two hinged-together links, the strut being held in an aligned position by a stabilizer member comprising two hinged-together links, themselves held in alignment by a locking member. According to the invention, the method includes the steps of arranging the strut and the stabilizer member in such a manner that at least one of the links of the stabilizer member moves continuously during a movement of the leg from the deployed position to the retracted position, and of attaching an operating actuator to said link in order to cause the link to pivot against the locking member and to exert thereon a force tending to move the leg.

Thus, the operating actuator acts simultaneously to move the links of the stabilizer member out of alignment against the locking member, thereby moving the links of the strut out of alignment, and also driving pivoting of the leg of the landing gear, since the links of the stabilizer member, the links of the strut, and the leg all form parts of a common linkage.

The fact that the movement of the actuated link is continuous serves to ensure that the landing gear is raised by means of action that is continuous and in the same direction of the actuator. The actuator may equally well be of the linear type or of the rotary type, providing it is compatible with the amplitude of the movement performed by the actuated link.

BRIEF DESCRIPTION OF THE FIGURES

The invention can be better understood from the light of the description of the figures of the accompanying drawings, in which.

DETAILED DESCRIPTION OF THE FIGURES

Figure 1:
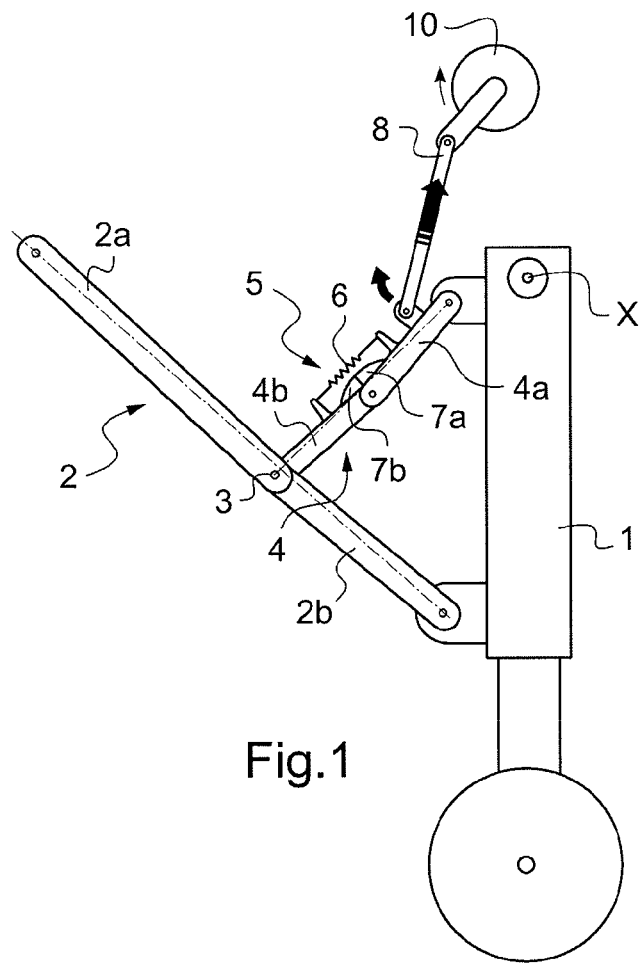
FIG. 1 is a side view of a landing gear applying the provisions of the invention, shown here in the deployed position.

With reference initially to FIG. 1, the landing gear comprises in conventional manner a leg 1 hinged to the structure of the aircraft about a hinge axis X (seen end-on in the figure) so as to be movable between a deployed position (as shown in the figure) into which the landing gear is put prior to making a landing, and a retracted position, which is the position of the landing gear in flight.

A folding strut 2 is hinged firstly to the leg 1 and secondly to the structure of the aircraft. The folding strut 2 comprises two links 2a and 2b that are hinged together via a knee 3. The link 2a is also hinged to the aircraft, while the link 2b is hinged to the leg 1. The folding strut 2 is stabilized in a substantially-aligned position by means of a stabilizer member 4 comprising two links 4a and 4b that are likewise hinged together. The link 4a is hinged to the leg 1 and the link 4b is hinged to the strut 2. The links 4a and 4b are held in a substantially-aligned position by a locking member 5 having return springs 6 urging the links 4a and 4b towards the locking position as defined by abutments 7a and 7b. When stabilized in this way, the folding strut 2 opposes any pivoting of the leg 1 about its hinge axis X, such that the deployed position is a stable position.

As is well known, the links 2a, 2b and the links 4a, 4b are designed in such a manner that in order to reach the locked position shown in the figure the hinged knee between each pair of links needs to go a little beyond the geometrically-aligned position as shown in dashed lines.

According to the invention, an operating actuator 10 is arranged on the structure of the aircraft for coupling to the link 4a of the stabilizer member 4, i.e. the link that is hinged to the leg 1. The operating actuator 10 in this example is of the rotary type and includes a crank that is coupled to the link 4a by means of a rod 8.

Figure 2:
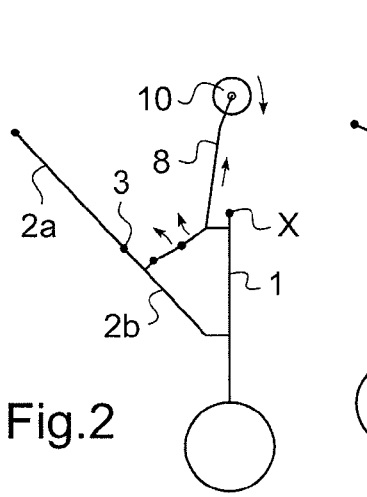
FIGS. 2 to 4 are skeleton side views of the FIG. 1 landing gear showing it in various stages while being raised, i.e. in the deployed position, in an intermediate position, and in the retracted position.
Figure 3:
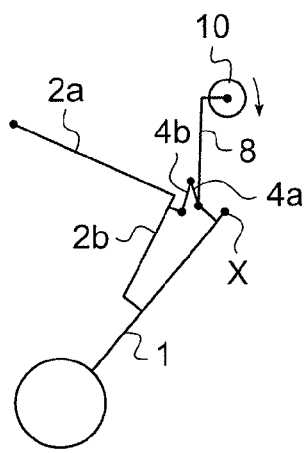

The operation of the assembly is described below with reference to FIGS. 2 to 4. When the landing gear is to be raised into the retracted position, the operating actuator 10 is put into operation. It exerts traction on the link 4a (see arrow), thereby causing it to pivot about its pivot axis relative to the leg, thereby breaking the alignment between the links 4a and 4b against the action of the return springs 6 of the locking member 5.

Since the link 4b is attached to the strut 2, the alignment of the links 2a and 2b is also broken. The landing gear is thus unlocked and can be pivoted about its hinge axis under drive from the operating actuator 10, as shown in FIG. 3.

As the operating actuator 10 continues to cause the link 4a to pivot, it entrains in succession the other link 4b, the links 2a and 2b of the strut 2, and finally the leg 1 of the landing gear. All of these elements are coupled together so that any angular position of the link 4a corresponds to one and only one position for each of the elements.

Figure 4:
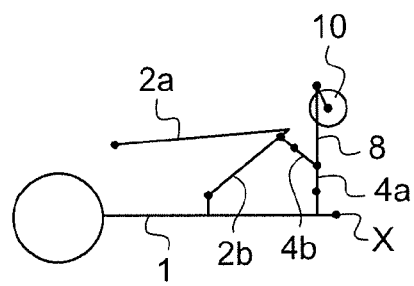

The movement continues to the position shown in FIG. 4, with the leg 1 in its retracted position.

It is important to ensure that during the movement of the landing gear from its deployed position to its retracted position, the link 4a moves continuously and without any singularity, such that the movement of the leg can be ensured by means of the operating actuator 10 acting continuously and always in the same direction on the link 4a. Thus, with a single actuator, it is ensured that the stabilizer member is moved out of alignment, thereby enabling the strut to be moved out of alignment, and consequently allowing the leg to be moved.

In order to lower the landing gear into the deployed position, this may be done under the effect of gravity, with the operating actuator 10 being controlled for the purpose of regulating the downward speed of the landing gear. The movement of the link 4a, which is continuous and without singularity in the raising direction, is therefore continuous and without singularity in the lowering direction, such that the operating actuator is always driven in the same direction while the landing gear is being lowered, and it therefore operates as a generator, thus enabling it to be used as a brake during lowering. To do this, it is naturally appropriate for the operating actuator to be reversible and to be capable of being driven by the link 4a while the landing gear is being lowered.

Figure 5:
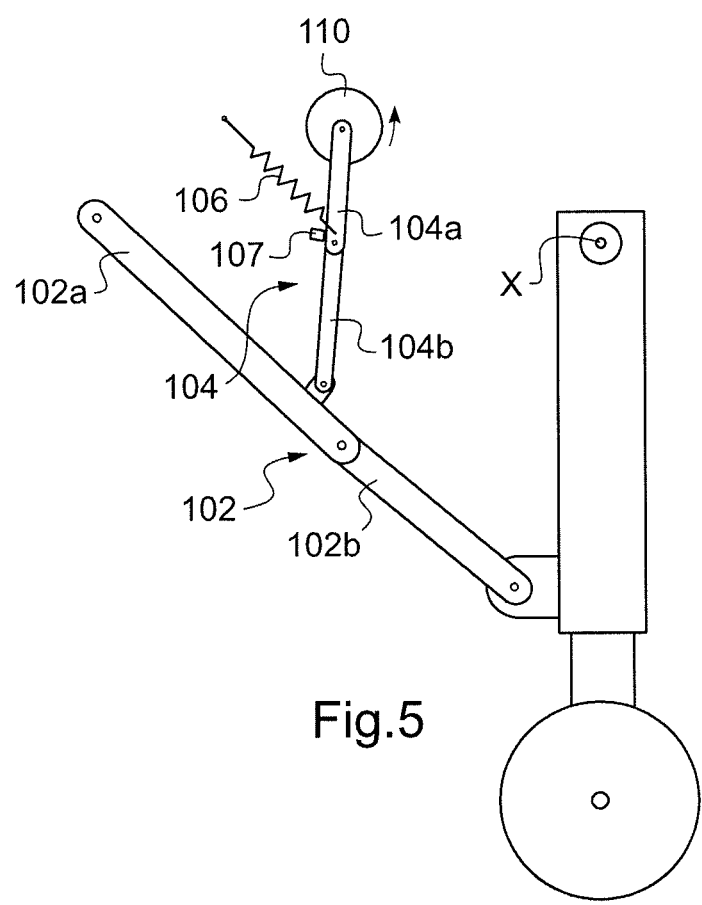
FIG. 5 is a view analogous to FIG. 1 for a variant embodiment of the invention.

In a variant shown in FIG. 5, where elements in common with those of FIG. 1 have the same references plus one hundred, the operating actuator 110 is still a rotary actuator, but it is placed directly on the pivot axis of the link 104a in order to drive it directly in pivoting. It should be observed here that the link 104a is now hinged not to the leg, but directly to the structure of the aircraft. It should also be observed that the locking spring 106 is also attached to the structure of the aircraft, the locking position of the links 104a and 104b now being defined by an abutment 107 arranged on the structure of the aircraft to stop the link 104a in the position shown in the figure, in which position it is substantially in alignment with the link 104b.

Once more, unlocking and raising of the landing gear is ensured using a single actuator.

Preferably, the actuator is selected to be of the simplest and most reliable possible type. Where possible, it is preferable for the actuator to be of the torque motor type, capable of providing direct drive without gearing. Should gearing become necessary, it is possible to use a very reliable step-down gear, e.g. of the deformable bell type, better known under the trade name "harmonic drive" that does not present a breakdown mode in which it jams.

The invention is not limited to the above description, but on the contrary covers any variant coming within the ambit defined by the claims.

In particular, the abutment(s) defining the substantially-aligned position of the links of the stabilizer member may be placed either between the links as in the example of FIG. 1, or on the structure of the aircraft for co-operating with the link that is actuated, as in the example of FIG. 5; however it could also co-operate with a moving portion of the actuator in order to stop it in a defined position, which position is confirmed by a spring member. Naturally, it is important for the actuator to be capable of moving the associated link against said spring member.

Furthermore, the operating actuator may be of the linear type, being coupled to one of the links of the stabilizer member, providing the stroke and the lever arms of such an actuator are compatible with raising the landing gear. The actuator may be of the electrical or of the hydraulic type.

In addition, although the actuator in the examples shown is fastened to the structure of the aircraft, it is also possible, still within the ambit of the invention, to attach the actuator directly to one of the elements of the landing gear, providing the actuator also remains attached to one of the links of the stabilizer member.

The invention claimed is:

1. An aircraft landing gear comprising:
   a leg hinged to the aircraft and operable between a deployed position and a retracted position, the leg being stabilized in the deployed position by a folding strut comprising two hinged-together links, the strut being held in an aligned position by a stabilizer member comprising two hinged-together links, the links of the strut being held in alignment by a locking member,
   wherein the strut and the stabilizer member are arranged in such a manner that at least one of the links of the stabilizer member moves continuously during a movement of the leg from the deployed position to the retracted position, and
   wherein an operating actuator is attached to said link in order to cause the link to pivot against the locking member and exert thereon a force tending simultaneously to bring the links of the stabilizer member out of alignment against the locking member, to bring the links of the strut out of alignment, and to move the leg into the retracted position.

2. A landing gear according to claim 1, wherein the operating actuator is of the rotary type and is attached to the associated link by means of a rod.

3. A landing gear according to claim 1, wherein the operating actuator is of the rotary type and is arranged directly at a hinge axis of the associated link in order to act directly on the link.

4. A method of operating an aircraft landing gear between a deployed position and a retracted position, the landing gear comprising a leg hinged to the aircraft, the leg being stabilized in the deployed position by a folding strut comprising two hinged-together links, the strut being held in an aligned position by a stabilizer member comprising two hinged-together links, themselves held in alignment by a locking member, the method comprising:

arranging the strut and the stabilizer member in such a manner that at least one of the links of the stabilizer member moves continuously during a movement of the leg from the deployed position to the retracted position, and attaching an operating actuator to said link in order to cause the link to pivot against the locking member and to exert thereon a force tending simultaneously to bring the links of the stabilizer member out of alignment against the locking member, to bring the links of the strut out of alignment, and to move the leg into the retracted position.

5. A method according to claim 4, wherein the operating actuator is of the rotary type and is attached to the associated link by means of a rod.

6. A method according to claim 4, wherein the operating actuator is of the rotary type and is arranged directly at a hinge axis of the associated link in order to act directly thereon.

\* \* \* \* \*